(12) United States Patent  (10) Patent No.: US 9,141,792 B2
Baluda et al.  (45) Date of Patent: Sep. 22, 2015

(54) APPLICATION-LEVEL ANOMALY DETECTION

(71) Applicant: International Business Machines Corporation, Armonk, NY (US)

(72) Inventors: Mauro Baluda, Seriate (IT); Paul C. Castro, Sharon, MA (US); Marco Pistoia, Amawalk, NY (US); John J. Ponzo, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/030,337

(22) Filed: Sep. 18, 2013

(65) Prior Publication Data

US 2014/0137246 A1  May 15, 2014

Related U.S. Application Data

(63) Continuation of application No. 13/676,438, filed on Nov. 14, 2012, now Pat. No. 8,931,101.

(51) Int. Cl.
*G06F 21/00* (2013.01)
*G06F 21/55* (2013.01)
*H04L 29/06* (2006.01)
(Continued)

(52) U.S. Cl.
CPC .............. *G06F 21/552* (2013.01); *G06F 21/52* (2013.01); *G06F 21/565* (2013.01); *G06F 21/566* (2013.01); *H04L 63/14* (2013.01); *H04L 63/1408* (2013.01); *H04W 12/08* (2013.01)

(58) Field of Classification Search
CPC . H04L 63/14; H04L 63/1408; H04L 63/1416; H04L 63/1425; G06F 21/566; G06F 21/565; G06F 21/552; G06F 21/561; G06F 21/55; G06F 21/52

USPC .................................................. 726/22–25
See application file for complete search history.

(56) References Cited

U.S. PATENT DOCUMENTS 6,012,152 A    1/2000  Douik et al.
6,530,024 B1 *  3/2003  Proctor ............................ 726/23
(Continued)

OTHER PUBLICATIONS

International Search Report issued in International Application No. PCT/US2013/069970 dated May 28, 2014.
(Continued)

*Primary Examiner* — Hadi Armouche
*Assistant Examiner* — Sher Khan
(74) *Attorney, Agent, or Firm* — Harrington & Smith

(57) ABSTRACT

An example includes intercepting one or more activities performed by an application on a computing device. The intercepting uses an instrumentation layer separating the application from an operating system on the computing device. The one or more activities are compared with one or more anomaly detection policies in a policy configuration file to detect or not detect presence of one or more anomalies. In response to the comparison detecting presence of one or more anomalies, indication(s) of the one or more anomalies are stored. Another example includes receiving indication(s) of anomaly(ies) experienced by an application on computing device(s) and analyzing the indication(s) of the anomaly(ies) to determine whether corrective action(s) should be issued. Responsive to a determination corrective action(s) should be issued based on the analyzing, the corrective action(s) are issued to the computing device(s). Methods, program products, and apparatus are disclosed.

19 Claims, 12 Drawing Sheets

(51) Int. Cl.
*G06F 21/56* (2013.01)
*G06F 21/52* (2013.01)
*H04W 12/08* (2009.01)

(56) References Cited

U.S. PATENT DOCUMENTS

| | | | | |
|---|---|---|---|---|
| 8,060,936 | B2* | 11/2011 | Mahaffey et al. | 726/25 |
| 8,104,087 | B2* | 1/2012 | Quinn et al. | 726/22 |
| 8,108,933 | B2* | 1/2012 | Mahaffey | 726/25 |
| 8,010,469 | B2 | 8/2012 | Kapoor et al. | |
| 8,418,224 | B2* | 4/2013 | Sato | 726/2 |
| 2004/0034794 | A1* | 2/2004 | Mayer et al. | 713/200 |
| 2008/0022404 | A1 | 1/2008 | Holtmanns et al. | |
| 2008/0060080 | A1* | 3/2008 | Lim | 726/26 |
| 2008/0071728 | A1 | 3/2008 | Lim | |
| 2008/0196104 | A1* | 8/2008 | Tuvell et al. | 726/24 |
| 2008/0263663 | A1 | 10/2008 | Ide et al. | |
| 2009/0199296 | A1 | 8/2009 | Xie et al. | |
| 2010/0043072 | A1* | 2/2010 | Rothwell | 726/24 |
| 2010/0107252 | A1 | 4/2010 | Mertoguno | |
| 2010/0235913 | A1* | 9/2010 | Craioveanu et al. | 726/23 |
| 2010/0306179 | A1 | 12/2010 | Lim | |
| 2011/0119454 | A1* | 5/2011 | Kung et al. | 711/150 |
| 2011/0219449 | A1* | 9/2011 | St. Neitzel et al. | 726/23 |
| 2011/0289580 | A1* | 11/2011 | Onuma | 726/12 |
| 2011/0314542 | A1* | 12/2011 | Viswanathan et al. | 726/23 |
| 2012/0137367 | A1 | 5/2012 | Dupont et al. | |
| 2012/0151270 | A1 | 6/2012 | Stolfo et al. | |
| 2012/0254995 | A1* | 10/2012 | Sallam | 726/22 |

OTHER PUBLICATIONS

Baah, G. et al.; "On-line Anomaly Detection of Deployed Software: A Statistical Machine Learning Approach"; SOQUA'06; Nov. 6, 2006; whole document (8 pages); ACM; Portland, OR, USA.

Chandola, V. et al.; "Anomaly Detection: A Survey"; Technical Report TR 07-017; Aug. 15, 2007; whole document (74 pages); University of Minnesota; Minneapolis, MN, USA.

Chandola, V. et al.; "Anomaly Detection: A Survey"; ACM Computing Surveys, vol. 41, No. 3, Article 15; Jul. 2009; whole document (58 pages).

Chow, G. et al.; "A Framework for Anomaly Detection in OKL4-Linux Based Smartphones"; In Proceedings of the 6th Australian Information Security Management Conference; 2008; whole document (10 pages).

Cucurull, J. et al.; "Modular Anomaly Detection for Smartphone Ad hoc Communication"; Information Security Technology for Applications, vol. 7161 of Lecture Notes in Computer Science; 2012; whole document (17 pages); Springer Berlin Heidelberg.

Hangal, S. et al.; "Tracking Down Software Bugs Using Automatic Anomaly Detection"; ICSE'02: Proceedings of the 24th International Conference on Software Engineering; 2002; whole document (11 pages); ICSE.

Schmidt, A. et al.; "Monitoring Smartphones for Anomaly Detection"; Mobilware '08; Feb. 12-15, 2008; whole document (15 pages); ACM; Innsbruck, Austria.

* cited by examiner

800

```
#register usernames with passwords (e.g. user.admin = admin means
username=admin with password admin)
user.admin=admin
user.demo=demo
user.dev=dev assigns labels to commands defined by the tuple
commandName = actual command that should be excuted
#   target = the unique ID of the widget that should receive command
#   parameters= an optional list of attribute value pairs that may be needed to
process command
command.disableButton={"commandName":"disable", "target":"uploadButtonId"};
command.setLabel={"commandName":"setLabel", "target":"mainScreenLabel",
"parameters":{"text":"Warning, you are in Cambridge"}}
command.setLabel={"commandName":"setLabel", "target":"mainScreenLabel",
"parameters":{"text":"Welcome to Yorktown Heights New User"}} policy definitions define ECA rules as follows
name: unique name for rule
#   resources: type of event this rule applies to. note that types are defined outside
this policy file
#   constraints: values specific to the event type needed to evaluate the condition
#   command: name of command (defined above) that should be issued if the
constraints evaluate to true
policy.anomaly={"name":"default", "resources":"locationAnomalyType",
"command":"disableButton"}
policy.anomaly={"name":"cambridge", "resources":"locationAnomalyType",
"constraints":{"location":"42.642041,-72.443848, 41.483891,-70.213623"},
"command":"setLabel"}
policy.anomaly={"name":"yorktown", "resources":"locationAnomalyType",
"constraints":{"location":"41.763117, -74.668579, 40.446947, -73.212891"},
"command":"setLabel"} policy to user mappings
assigns policies to users of the systems
policy.assign={"userid":["admin"],"policyName":["default"]}
policy.assign={"userid":["demo"],"policyName":["cambridge","yorktown"]}
policy.assign={"userid":["dev"],"policyName":["default"]}

-------EOF
```

FIG. 8

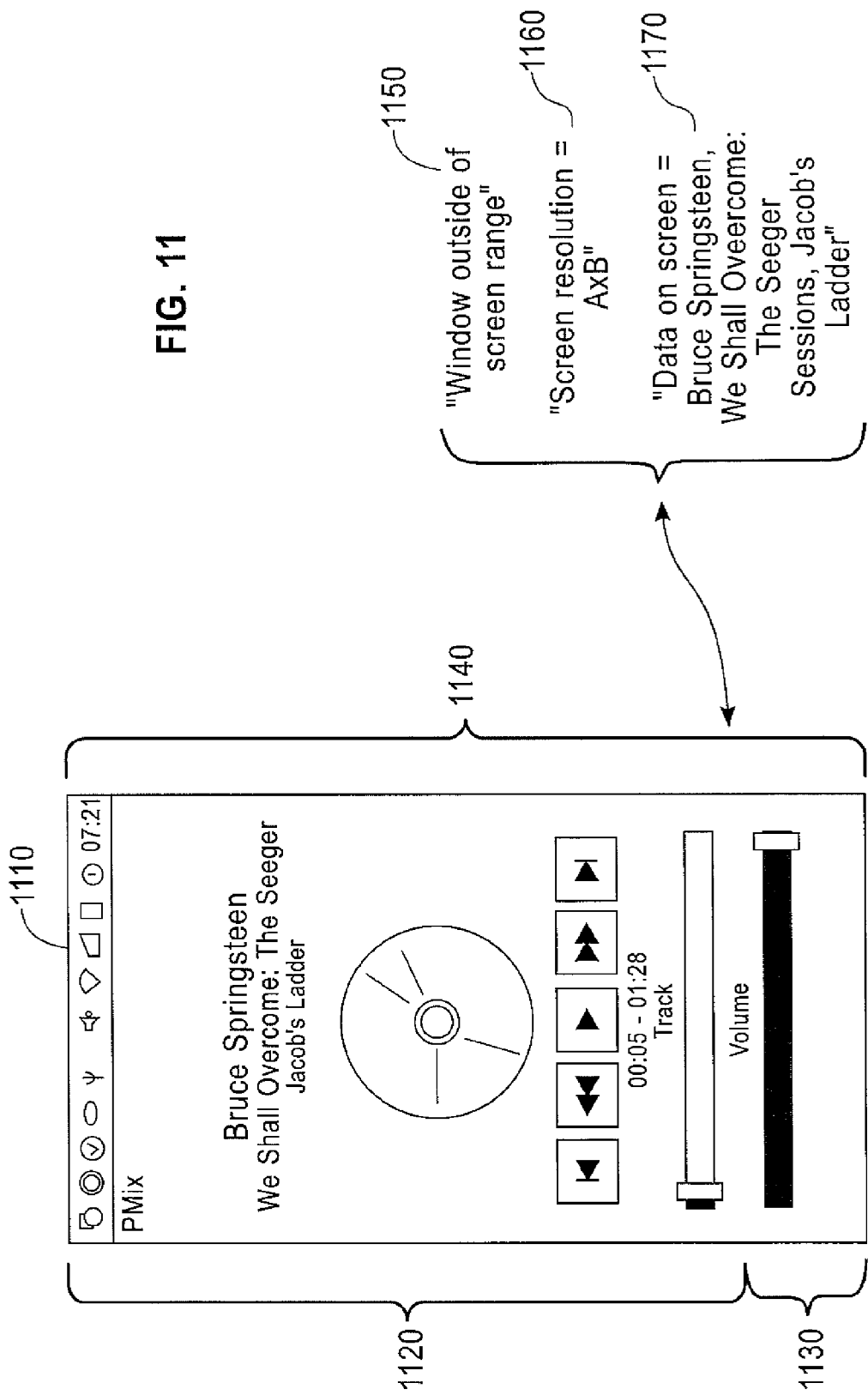

APPLICATION-LEVEL ANOMALY DETECTION

CROSS-REFERENCE TO RELATED APPLICATIONS

This patent application is a continuation of U.S. patent application Ser. No. 13/676,438, filed on Nov. 14, 2012, which is incorporated herein by reference in its entirety to provide continuity of disclosure.

BACKGROUND

This invention relates generally to applications executing on electronic computing systems and, more specifically, relates to detecting anomalies related to the applications.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms that appear in the text or drawings are defined below, prior to the claims.

Anomaly detection refers to detecting patterns in a data set that do not conform to an established normal behavior. Additional information regarding anomaly detection may be found in V. Chandola et al., "Anomaly detection: A survey", ACM Comput. Surv. 41, 3, Article 15 (July 2009). Anomaly detection is applicable to many different areas, but one area of interest is anomaly detection for applications executing on computing systems. A typical scenario in this area is where data associated with an application is logged. The logged data is subsequently transferred at some point to a server. The server analyzes the logged data, e.g., from many computing systems, and determines whether or not an anomaly exists.

While this type of anomaly detection can be beneficial, anomaly detection for applications executing on computing systems may be improved.

BRIEF SUMMARY

An example is a method that includes intercepting one or more activities performed by an application on a computing device, the intercepting using an instrumentation layer separating the application from an operating system on the computing device, and comparing the one or more activities with one or more anomaly detection policies in a policy configuration file to detect or not detect presence of one or more anomalies. The method includes, in response to the comparison detecting presence of one or more anomalies, storing one or more indications of the one or more anomalies.

An apparatus is disclosed that includes the following: means for intercepting one or more activities performed by an application on a computing device, the intercepting using an instrumentation layer separating the application from an operating system on the computing device; means for comparing the one or more activities with one or more anomaly detection policies in a policy configuration file to detect or not detect presence of one or more anomalies; and means, responsive to the comparison detecting presence of one or more anomalies, for storing one or more indications of the one or more anomalies.

A further exemplary embodiment is a computing device including one or more memories comprising computer-readable code, and one or more processors, configured in response to executing the computer-readable code to cause the computing device to perform: intercepting one or more activities performed by an application on a computing device, the intercepting using an instrumentation layer separating the application from an operating system on the computing device; comparing the one or more activities with one or more anomaly detection policies in a policy configuration file to detect or not detect presence of one or more anomalies; and in response to the comparison detecting presence of one or more anomalies, storing one or more indications of the one or more anomalies.

An additional exemplary embodiment is a computer program product, comprising a computer readable storage medium having computer readable program code embodied therewith, the computer readable program code comprising: code for intercepting one or more activities performed by an application on a computing device, the intercepting using an instrumentation layer separating the application from an operating system on the computing device; code for comparing the one or more activities with one or more anomaly detection policies in a policy configuration file to detect or not detect presence of one or more anomalies; and code, in response to the comparison detecting presence of one or more anomalies, for storing one or more indications of the one or more anomalies.

Another exemplary embodiment is a method comprising: receiving one or more indications of one or more anomalies experienced by an application on one or more computing devices; analyzing the one or more indications of the one or more anomalies to determine whether one or more corrective actions should be issued; and responsive to a determination one or more corrective actions should be issued based on the analyzing, issuing the one or more corrective actions to the one or more computing devices.

A further exemplary embodiment is an apparatus comprising: means for receiving one or more indications of one or more anomalies experienced by an application on one or more computing devices; means for analyzing the one or more indications of the one or more anomalies to determine whether one or more corrective actions should be issued; and means for responsive to a determination one or more corrective actions should be issued based on the analyzing, issuing the one or more corrective actions to the one or more computing devices.

A further exemplary embodiment is a computing device including one or more memories comprising computer-readable code, and one or more processors, configured in response to executing the computer-readable code to cause the computing device to perform: receiving one or more indications of one or more anomalies experienced by an application on one or more computing devices; analyzing the one or more indications of the one or more anomalies to determine whether one or more corrective actions should be issued; and responsive to a determination one or more corrective actions should be issued based on the analyzing, issuing the one or more corrective actions to the one or more computing devices.

An additional exemplary embodiment is a computer program product, comprising a computer readable storage medium having computer readable program code embodied therewith, the computer readable program code comprising: receiving one or more indications of one or more anomalies experienced by an application on one or more computing devices; analyzing the one or more indications of the one or more anomalies to determine whether one or more corrective actions should be issued; and responsive to a determination one or more corrective actions should be issued based on the analyzing, issuing the one or more corrective actions to the one or more computing devices.

BRIEF DESCRIPTION OF THE SEVERAL VIEWS OF THE DRAWINGS

FIG. 8 is an example of policy configuration file used for the example of FIG. 7;

FIG. 11 is an example of a music application that has an anomaly of a vertical layout issue.

DETAILED DESCRIPTION

Figure 1:
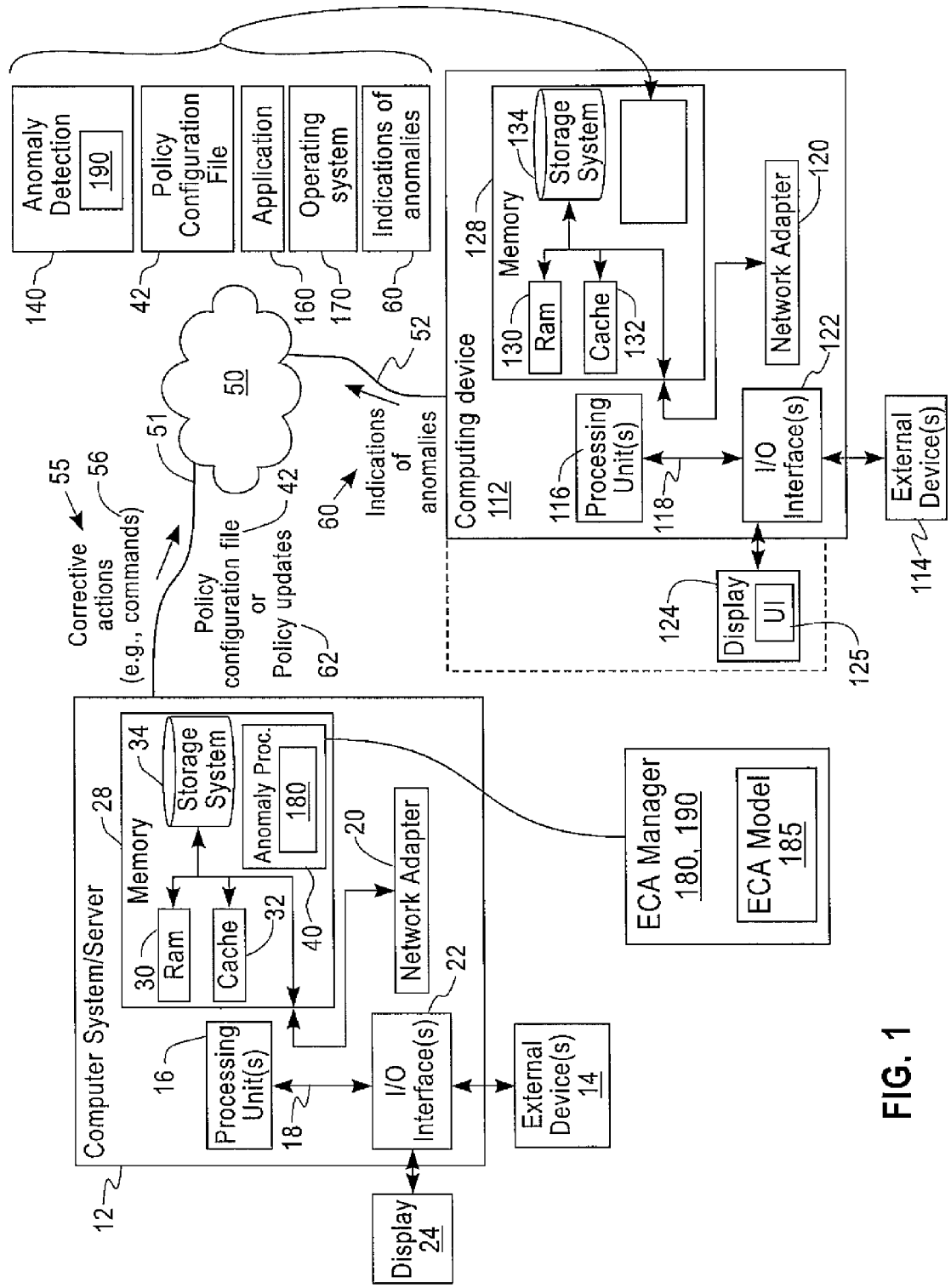
FIG. 1 is a block diagram of a computing device and a server in communication via a network, in accordance with an exemplary embodiment of the instant invention.

As stated above, while anomaly detection of applications that uses a server to analyze logged data from the applications can be beneficial, anomaly detection for applications executing on computing systems may be improved. For instance, mobile application projects using enterprise software are expected to outnumber PC projects by a ratio of 4 to 1 by 2015. Further, in terms of mobile enterprise software, "bring your own device" to the enterprise makes employees work an extra 20 hours per week, which means that enterprises have an incentive to allow more mobile devices accessing their IT infrastructure.

Typical anomaly detection for mobile devices works as follows:

1) Data for an application is logged on the mobile devices;
2) The logs are transferred to the backend, e.g., an enterprise server associated with the application; and
3) Data in the logs is analyzed offline to search for anomalies.

A straightforward application of anomaly detection techniques would treat a mobile device as any other terminal. However, mobile devices are different from a typical terminal in an enterprise. For example, mobile devices can operate while disconnected from the IT infrastructure, there are network/battery/storage constraints that exist for mobile devices, and it may be infeasible to transfer fine-grained logs via wireless interfaces.

Exemplary embodiments of this invention solve the important problem (as an example) of automatically detecting, reporting and securing anomalies in an application or in the way a user interacts with a computing system. Four exemplary and non-limiting features of certain exemplary embodiments of this invention include the fact that the anomaly detection mechanism and policy (1) does not have to be part of the application code (e.g., so no expensive code changes are required, and no security experience is demanded of developers), (2) does not have to be part of the operating system on which the program is executed (thereby making the solution portable across platforms), (3) does not have to reside on a server (which is a particularly useful property, especially when anomaly detection has to be applied to mobile applications and the mobile devices may be, intentionally or unintentionally, disconnected from the network), and (4) can be dynamically updated without requiring the application to be re-installed (another good feature that makes this solution particularly useful to mobile devices). Additional exemplary features of exemplary embodiments includes the fact that, once an anomaly is detected based on a given policy, (5) corrective actions can be taken instantly (for example, the application can be disabled, entirely or limited to specific functions; all or part of its data can be wiped or encrypted; a message can be displayed), (6) for all users or only certain users, (7) the policy can be updated, and (8) this approach also does not require changing the source code of the application. Another feature of an exemplary embodiment of the invention is that, since a technique allows for anomaly detection to run on the client, there is no need for client computing systems to inundate server machines with massive amounts of data (e.g., at the expense of the network connectivity quality, battery and power consumption, and disk space on the server). This exemplary embodiment allows for anomaly detection to run in isolation and to provide data to the server incrementally, and with more precision, for example when an anomaly is suspected. Another possible feature of an exemplary embodiment includes the fact that this approach can also be used to detect anomalies in application code (for example, to detect code that has not properly tested), and not just anomalies in the way users interact with an application or the system. Another possible feature of an exemplary embodiment of this invention is that the techniques may be transparent to the anomaly detection engine. This means that any anomaly detection engine can be "plugged" into a structure of an exemplary embodiment.

Current techniques for anomaly detection do not offer one or more of the features described above. Therefore, the current techniques are very impractical, particularly for mobile applications, running on mobile computing devices, where applications are prevented from loading dynamic code at run time, which prevents an application from loading a different policy if this is policy hard-coded.

Referring to FIG. 1, a block diagram of a computing device 112 and a computing system/server 12 in communication via a network 50, in accordance with an exemplary embodiment of the instant invention. FIG. 1 is used to provide an overview of a system in which exemplary embodiments may be used and to provide an overview of an exemplary embodiment of instant invention. In FIG. 1, there is a computer system/server 12, which is operational with numerous other general purpose or special purpose computing system environments or configurations. Examples of well-known computing systems, environments, and/or configurations that may be suitable for use (e.g., as computing device 112) with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As shown in FIG. 1, computer system/server 12 is shown in the form of a general-purpose computing device. For simplicity, the computer system/server 12 will be referred to as "server 12" in the rest of this disclosure. However, there may not be a true server/client relationship between the server 12 and the computing device 112. The components of server 12 may include, but are not limited to, one or more processors or processing units 16, a system memory 28, and a bus 18 that couples various system components including system memory 28 to one or more processing units 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Server 12 typically includes a variety of computer system readable media, such as memory 28. Such media may be any available media that is accessible by server 12, and such media includes both volatile and non-volatile media, removable and non-removable media. System memory 28 can include computer system readable media in the form of volatile memory, such as random access memory (RAM) 30 and/or cache memory 32. Server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a removable, non-volatile memory, such as a memory card or "stick" may be used, and an optical disk drive for reading from or writing to a removable, non-volatile optical disk such as a CD-ROM, DVD-ROM or other optical media can be provided. In such instances, each can be connected to bus 18 by one or more I/O (Input/Output) interfaces 22.

Server 12 may also communicate with one or more external devices 14 such as a keyboard, a pointing device, a display 24, etc.; one or more devices that enable a user to interact with server 12; and/or any devices (e.g., network card, modem, etc.) that enable server 12 to communicate with one or more other computing devices. Such communication can occur via, e.g., I/O interfaces 22. Still yet, server 12 can communicate with one or more networks such as a local area network (LAN), a general wide area network (WAN), and/or a public network (e.g., the Internet) via network adapter 20. As depicted, network adapter 20 communicates with the other components of server 12 via bus 18. It should be understood that although not shown, other hardware and/or software components could be used in conjunction with server 12. Examples, include, but are not limited to: microcode, device drivers, redundant processing units, external disk drive arrays, RAID systems, tape drives, and data archival storage systems, etc.

The computing device 112 also comprises a memory 128, one or more processing units 116, one or more I/O interfaces 122, and one or more network adapters 120, interconnected via bus 118. The memory 128 may comprise non-volatile and/or volatile RAM, cache memory 132, and a storage system 134. Depending on implementation, memory 128 may include removable or non-removable non-volatile memory. The computing device 112 may include or be coupled to the display 124, which has a UI 125. Depending on implementation, the computing device 112 may or may not be coupled to external devices 114. The display may be a touchscreen, flatscreen, monitor, television, projector, as examples. The bus 118 may be any bus suitable for the platform, including those buses described above for bus 18. The memories 130, 132, and 134 may be those memories 30, 32, 34, respectively, described above. The one or more network adapters 120 may be wired and/or wireless network adapters. The wireless network adapters may support cellular systems, wireless personal area network systems engaging in operations generally described by standards such as the IEEE 802.15 (e.g., Bluetooth), and network connections such as WiFi. The I/O interface(s) 122 may be interfaces such as USB (universal serial bus), SATA (serial AT attachment), HDMI (high definition multimedia interface), and the like. The processing unit(s) may be single-core processors, multi-core processors, digital signal processors, system-on-a-chip integrated circuits, application-specific integrated circuits, programmable logic, and the like, and some combination of these.

In certain exemplary embodiments, the computing device 112 operates differently for each of two modes, disconnected and connected. A disconnected mode occurs, e.g., when the computing device 112 cannot access the server 12. A connected mode, by contrast, occurs when the computing device 112 can access the server 12. First, an overview of anomaly detection in some exemplary embodiments is presented, then an overview of the two modes is presented.

In this example, the server 12 is connected to the computing device 112 via network 50 and links 51, 52. The network 50 may be the Internet, an intranet as in an enterprise scenario, a cellular system, or any combination of these. The computing device 112 includes an anomaly detection module 140 and a policy configuration file 42. The anomaly detection module 140 comprises computer-readable code stored in some portion(s) of the memory 128. The computing device 112, under control of the processing unit(s) 116 in response to executing the computer-readable code in the anomaly detection module 140, performs operations defined by the anomaly detection module 140. In particular, through techniques described in more detail below and in certain exemplary embodiments, the anomaly detection module 140 intercepts activities of the application 160, e.g., by intercepting interactions between the application 160 and the operating system 170. The anomaly detection module 140 then compares the intercepted actions with policies in the policy configuration file 42 to determine whether an anomaly has occurred. If the comparison indicates an anomaly has occurred, the anomaly detection module 140 then stores indications 60 of the anomalies. The computing device 112 may connect (e.g., periodically or when in a connected mode) to the server 12 at least in order to send indications 60 of anomalies to the server 12.

The server 12, meanwhile, has an anomaly processing module 40 in an exemplary embodiment. The server 12, under control of the processing unit(s) 16 in response to executing the computer-readable code in the anomaly processing module 40, performs operations defined by the anomaly processing module 40. In an exemplary embodiment, the server 12, under direction of the anomaly processing module 40, will send corrective actions 55 to the computing device 112, e.g., based on an analysis of the indications 60 of the anomalies and a determination that the corrective actions 55 are to be sent. The server 12 will also send the original policy configuration file 42 to the computing device 112, and may also send updates 62 to the policy configuration file 42 or a completely new policy configuration file 42, when deemed appropriate. This example has a single server 12 interacting with the computing device 112 to send corrective actions 55/receive indications 60 of anomalies and also to send the policy configuration file 42 to the computing device 112. However, this functionality may be split amongst multiple servers 12.

In exemplary embodiments, the anomaly processing module 40 comprises an ECA (Event-Condition-Action) manager 180 and an ECA model 185. In these embodiments, the anomaly detection can run in two modes: connected and disconnected. In the former, anomalies are forwarded by the server 112 to a server, which is used to aggregate anomaly data and update any anomaly models, in this example, an ECA model 185. The server 12 can additionally issue commands 56 at any time to the client, e.g., computing device 112. In the context of anomaly detection, the commands 56 would be triggered based on the policy which (in an example embodiment) is an Event-Condition-Action model 185. In this model, the event is the detection of an anomaly, the condition evaluates the event to see what actions (if any) apply, and the actions include many different types of actions, of which many are described herein. For instance, for a mobile device as computing device 112, the mobile device may be locked as an example of an action response to a command. These rules are encoded in an ECA manager component (e.g., 180) that can be configured using a policy configuration file containing 42 a list of ECA statements (that is, rules). It is noted that the ECA model can be a sub-part of the policy configuration file, which may contain more than just ECA rules. For example, the policy configuration file may specify what anomaly detection model should be used at runtime.

In disconnected mode, the ECA manager 190 would be located on the client, computing device 112. The ECA manager 190 would be configured using the policy configuration file 42 in a similar manner to what was just described for the connected mode.

It should be noted that commands 56 are a subset of corrective actions 55. The corrective actions 55 could include such items as patching the application 160, installing a new version of the application 160, disabling certain functions in the application 160, and the like.

Figure 2:
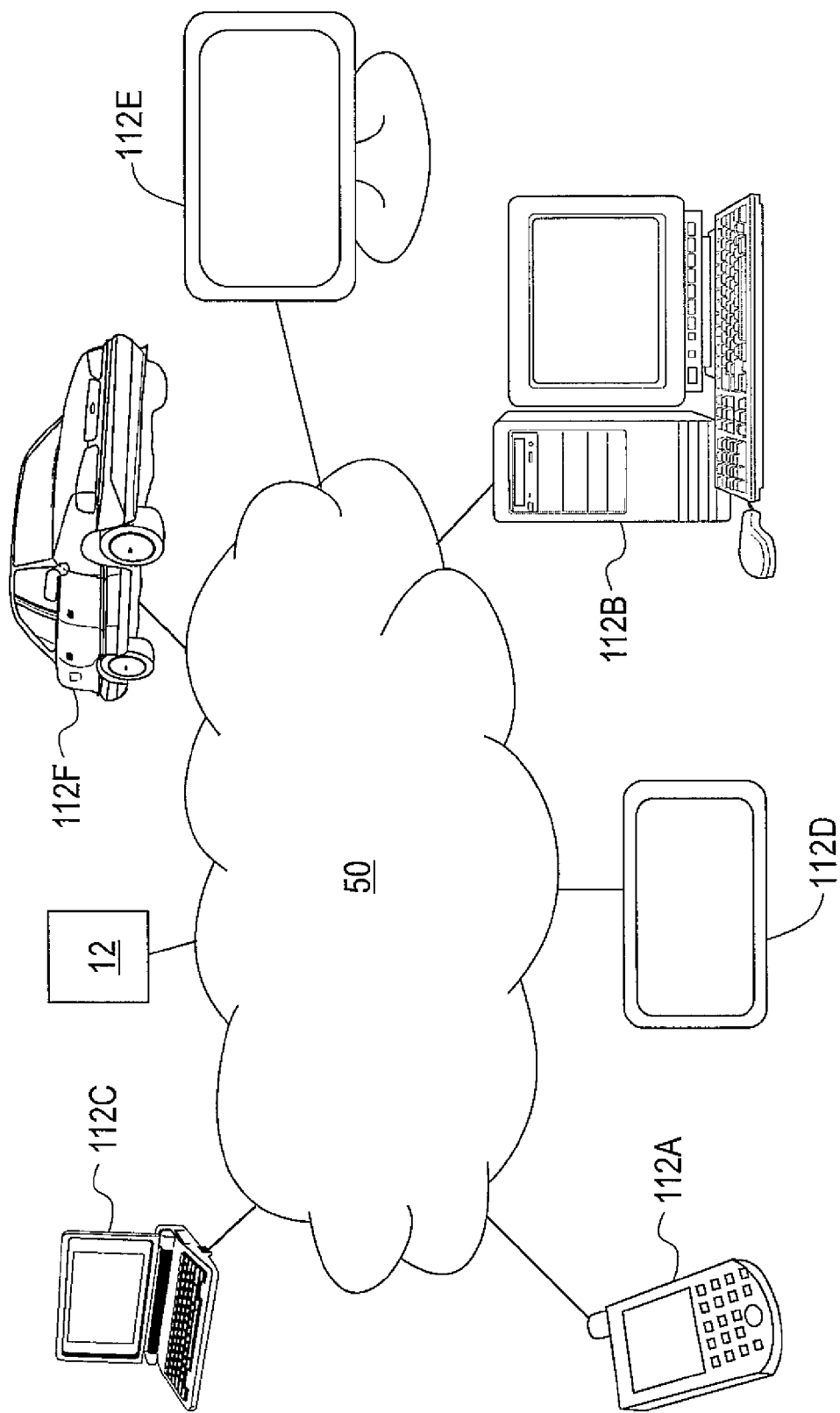
FIG. 2 depicts a networked environment according to an exemplary embodiment of the present invention.

Turning to FIG. 2, a networked environment is illustrated according to an exemplary embodiment of the present invention. In this example, the server 12 is shown separate from network 50, but could be part of the network. There are A through E different computing devices 112 shown: smartphone 112A, desktop computer 112B, laptop 112C, tablet 112D, television 112E, and automobile computer system 112F. Not shown but equally applicable are set-top boxes and game consoles. These are merely exemplary and other devices may also be used. The anomaly detection module 140 can be configured to execute on each computing device 112.

It is noted that the examples provided below place primary emphasis on mobile devices, such as the smartphone 112A or the tablet 112D. However, the instant techniques may be applied to many other computing devices.

Figure 3:
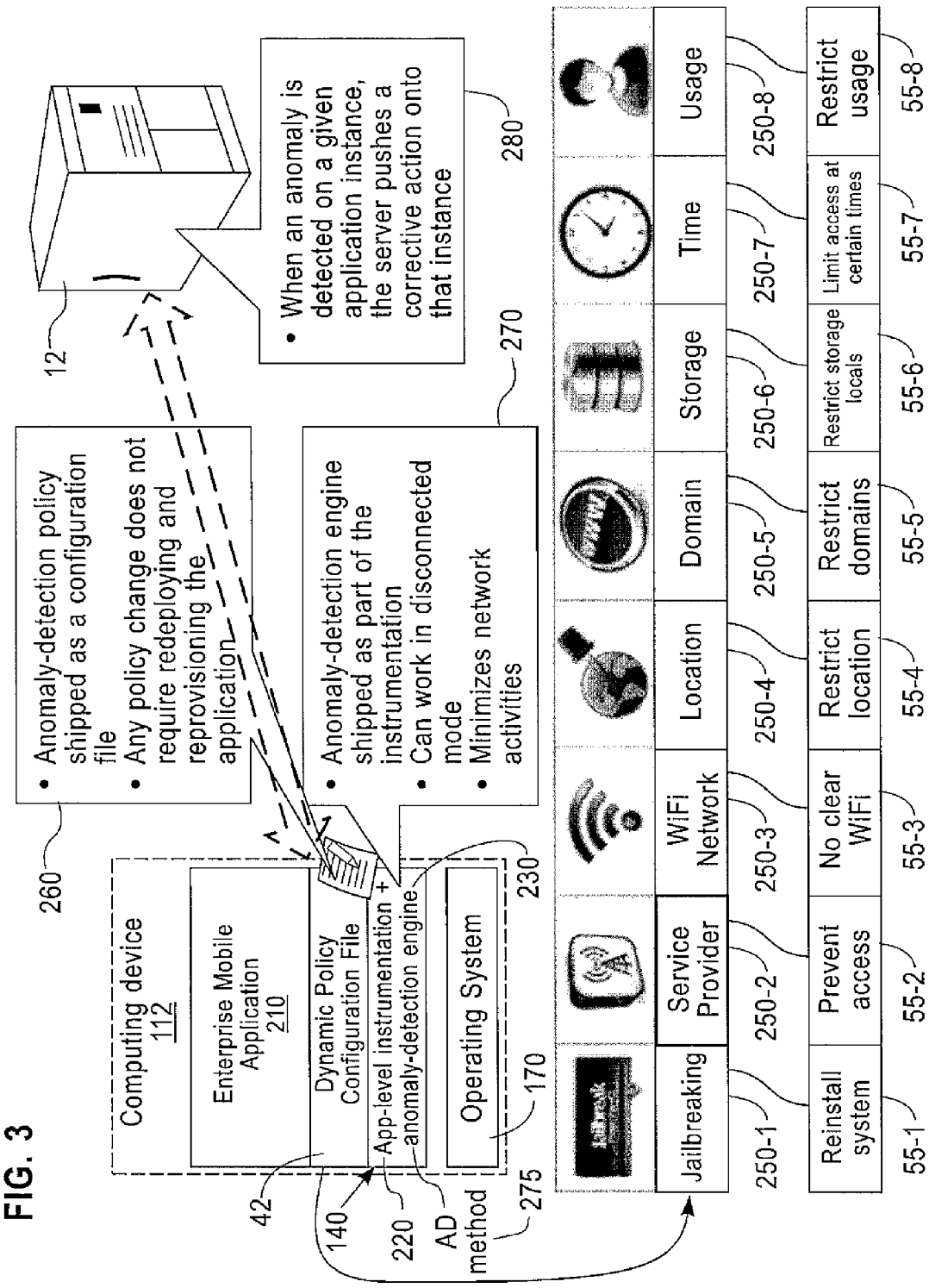
FIG. 3 is a block diagram of a computing device and a server and configuration therein and operations performed thereby, in an exemplary embodiment of the instant invention.

Referring to FIG. 3, a block diagram is shown of a computing device and a server and configuration therein and operations performed thereby, in an exemplary embodiment of the instant invention. The application 160 in this example is an enterprise mobile application 210, which is a mobile application issued and/or controlled by an enterprise. However, this is merely exemplary and not a limitation. Computing device 112 also comprises a policy configuration file 42, which is dynamic as the policy configuration file 42 may be changed at any time. As indicated by block 260, an anomaly-detection policy may be shipped (e.g., by server 12 to the computing device 112) as a configuration file. Also, any policy change does not require redeploying and re-provisioning the application 160, as the policy configuration file 42 may simply be modified or replaced. As indicated by block 280, when an anomaly is detected on a given application instance, the server pushes a corrective action 55 onto that instance.

The anomaly detection module 140 in this example comprises an application (app)-level instrumentation 220 and an anomaly-detection engine 230. The anomaly detection engine 230 may include an anomaly detection (AD) method 275. As indicated by block 270, the anomaly-detection engine 230 can be shipped as part of the application-level instrumentation 220. Both the application-level instrumentation 220 and the anomaly-detection engine 230 can work in disconnected mode (e.g., while the computing device 112 is not connected to the network 50 or is not connected to an enterprise IT infrastructure such as network 50).

This exemplary embodiment separates the application code in application 210 from an application-level instrumentation 220, which can incorporate or be coupled to any anomaly-detection engine 230. This separation between the application 210 and at least the anomaly-detection engine 230 is beneficial because any change in the anomaly-detection engine 230 does not require changing the code of the application 210, e.g. as indicated in block 270. Furthermore, the anomaly-detection policy (e.g., in the policy configuration file 42) is completely decoupled from the application code in application 210 as well as the application-level instrumentation 220 and the anomaly-detection engine 230.

Exemplary embodiments are based on an ability to instrument application code in application 210 with no or minimal access to the source code of the application 210. The application code is instrumented with a layer (e.g., application-level instrumentation 220) that sits between the application 210 and the operating system 240. This layer 220 is, e.g., capable of intercepting a wide-range of application activity such as internal function calls, interactions with the environment or user, as well as more fine-grained application activity such as monitoring internal program data structures or low-level system calls. Two examples for the anomaly detection module 140 for possible implementation are the Android and iOS operating systems for mobile platforms although the exemplary embodiments are not limited to mobile platforms. On iOS, the instrumentation layer 220 is injected through method swizzling, which is a technique that allows for redirecting calls to certain methods to other methods. On Android, the instrumentation layer 220 is injected via class loading and/or bytecode rewriting.

A policy or policies, in the form of a text file, a JSON input file, or and XML file, as examples, can be dynamically loaded or re-loaded (when changes occur) to the policy configuration file 42 without having to re-provision the application 162.

The anomaly-detection engine 230 can run on the client. Exemplary and non-limiting advantages of client-side anomaly detection include the following:

1. Anomaly detection can work also when a device is (intentionally or unintentionally) disconnected from any form of network (see block 270); and/or
2. It is not necessary for clients to constantly send all data to the server 12 (which saves battery and power for portable devices, network bandwidth, and disk or other memory space, especially for portable devices that generally have limited storage space).

The application-level instrumentation 220 can respond to commands from the server 12, shut down the application 160, disable some of its functions, wipe parts of its data, encrypt security-sensitive data, display messages, and the like.

The anomaly detection engine can detect anomalies 250 such as: jailbreaking 250-1 or other privileged control attainment, difference in wireless (e.g., cellular) service providers 250-2 (e.g., as compared to allowed providers), differences in WiFi networks 250-3 as compared to allowed WiFi networks, unallowed locations 250-4 as compared to allowed locations, attempts to reach forbidden domains 250-4, attempts to use unauthorized data storage repositories 250-6, inconsistent time (e.g., of use of a computing device 112) 250-7 as compared to previously learned times, unauthorized or inconsistent usage of the application 250-8, and problems in the application code itself. Jailbreaking is a term used for the iOS operating system that operates on iPhones, which is a type of "smartphone". Jailbreaking is a process to gain privileged control within the operating system. This is also referred to as gaining root access to the operating system. On smartphones using the Android operating system, a similar process is called "rooting". Each one of these anomalies 250 may have a corresponding corrective action 55, such as reinstalling the system 55-1, preventing access to particular service provider(s) 55-2, preventing access to "clear" (i.e., unencrypted) Wi-Fi networks 55-3, restricting (e.g., physical) locations to certain locations 55-4, restricting domains (e.g., preventing access to certain domains or allowing access only to certain domains) 55-5, restricting storage to authorized storage repositories 55-6, limiting access at certain times (e.g., between midnight and 4 a.m.) 55-7 and restricting usage to authorized or consistent usage 55-8. Commands 56 to cause these corrective actions 55 to occur will be similar to the corrective actions and easily created by those skilled in this area.

Figure 4A:
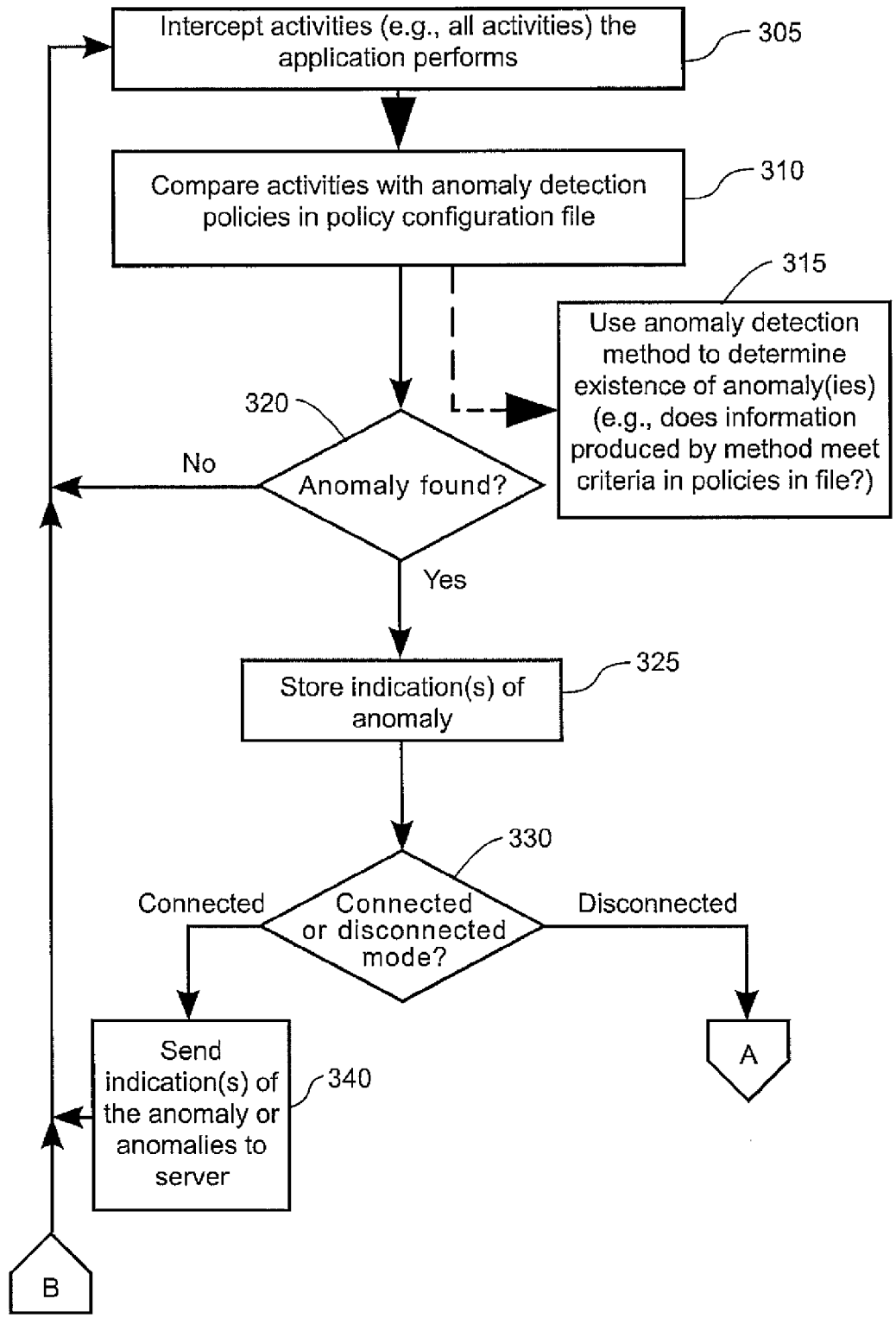
FIG. 4A is logic flow diagram performed by a computing device for anomaly detection that illustrates the operation of an exemplary method, a result of execution of computer program instructions embodied on a computer readable memory, and/or functions performed by logic implemented in hardware, in accordance with an exemplary embodiment of this invention.
Figure 4B:
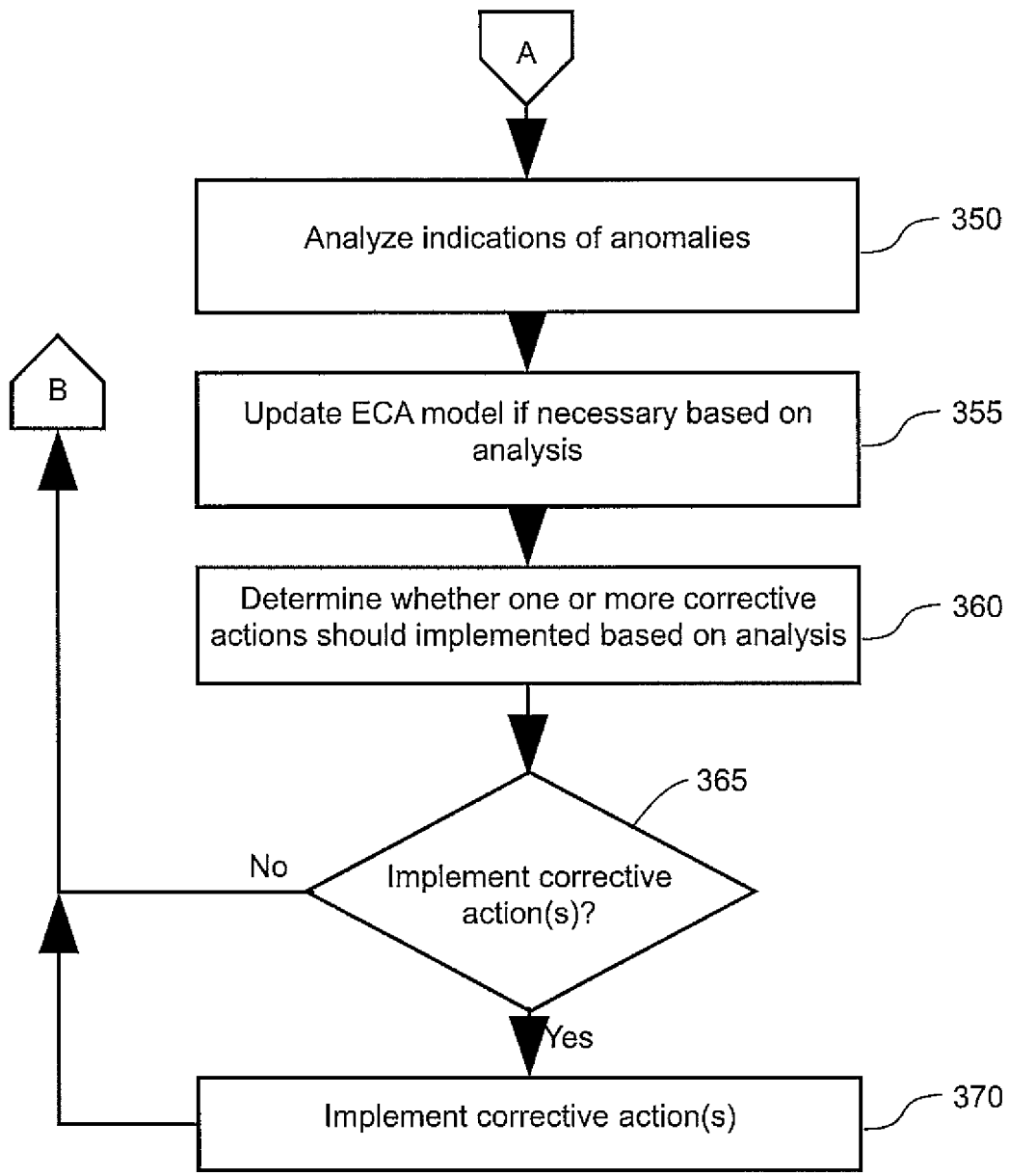
FIG. 4B is logic flow diagram performed by a computing device for anomaly processing that illustrates the operation of an exemplary method, a result of execution of computer program instructions embodied on a computer readable memory, and/or functions performed by logic implemented in hardware, in accordance with an exemplary embodiment of this invention.

FIG. 4A is logic flow diagram performed by a computing device for anomaly detection, while FIG. 4B is logic flow diagram performed by a computing device for anomaly processing. These flow diagrams illustrate the operation of exemplary methods, a result of execution of computer program instructions embodied on a computer readable memory, and/or functions performed by logic implemented in hardware, in accordance with exemplary embodiments of this invention. This example assumes the anomaly detection module 140 has received the policy configuration file 42. The blocks in FIG. 4A may be performed by the anomaly detection module 140.

The anomaly detection module 140 in block 305, e.g., using the application-level instrumentation 220, intercepts all activities the application performs. In block 310, the anomaly detection module 140 compares, e.g., using the anomaly-detection engine 230, the activities with the anomaly detection policies in the policy configuration file 42. In one example, in block 315, the anomaly detection module 140 uses an anomaly detection method to determine existence of anomaly(ies). In one such example, the comparison includes whether information produced by the AD method meets criteria in policies in the policy configuration file 42, as described in more detail below.

In block 320, the anomaly detection module 140 determines if an anomaly is found based on the comparison. If not (block 320=No), the flow proceed in block 305. If so (block 320=Yes), the anomaly detection module 140 stores (block 325) an indication of the anomaly. For instance, if the anomaly is a location that is different from a set of previous locations, the indication may be an indication of the location or an indication of the location and an indication of the difference (e.g., "this location is greater than 100 miles from the previous set of locations").

In block 330, it is determined if the computing device 112 is in connected or disconnected mode. In one example, the computing device 112 is in connected mode when the computing device 112 can access (e.g., via wireless or wired network(s)) the server 12 and is in disconnected mode when the computing device 112 cannot access the server 12. This example is applicable in many instances to computing devices 112 that are mobile devices. Alternatively or in combination, a computing device 112 can be set to be in a disconnected mode for a first time period and set to be in a connected mode for a second time period. This example could be useful for computing devices 112 that may be able to contact a server 12 at any time, but to reduce network traffic, the disconnected mode is used.

In response to the computing device 112 being in connected mode (block 330=connected), in block 340, the anomaly detection module 140 sends indication(s) of the anomaly or anomalies to the server 12. In response to the computing device 112 being in disconnected mode (block 330=disconnected), the flow continues to FIG. 4B. FIG. 4B can be considered to be performed by the ECA manager 190. In block 350, the ECA manager 190 analyzes indications of anomalies 250. In block 355, the ECA manager 190 updates the ECA model 185, if necessary, based on the analysis performed in block 350. In block 360, the ECA manager 190 determines whether one or more corrective actions 55 should implemented based on the analysis. In this example, the corrective actions are typically limited to commands 56. As stated above, in the ECA model 185, the event is the detection of an anomaly 250, the condition evaluates the event to see what actions (if any) apply, and exemplary corrective actions 55 are stated already above. If corrective action(s) are not to be implemented (block 365=No), the flow continues to block 305 of FIG. 4A. If corrective action(s) are to be implemented (block 365=Yes), in block 370, the corrective actions are implemented and the flow continues to block 305 of FIG. 4A.

Figure 5:
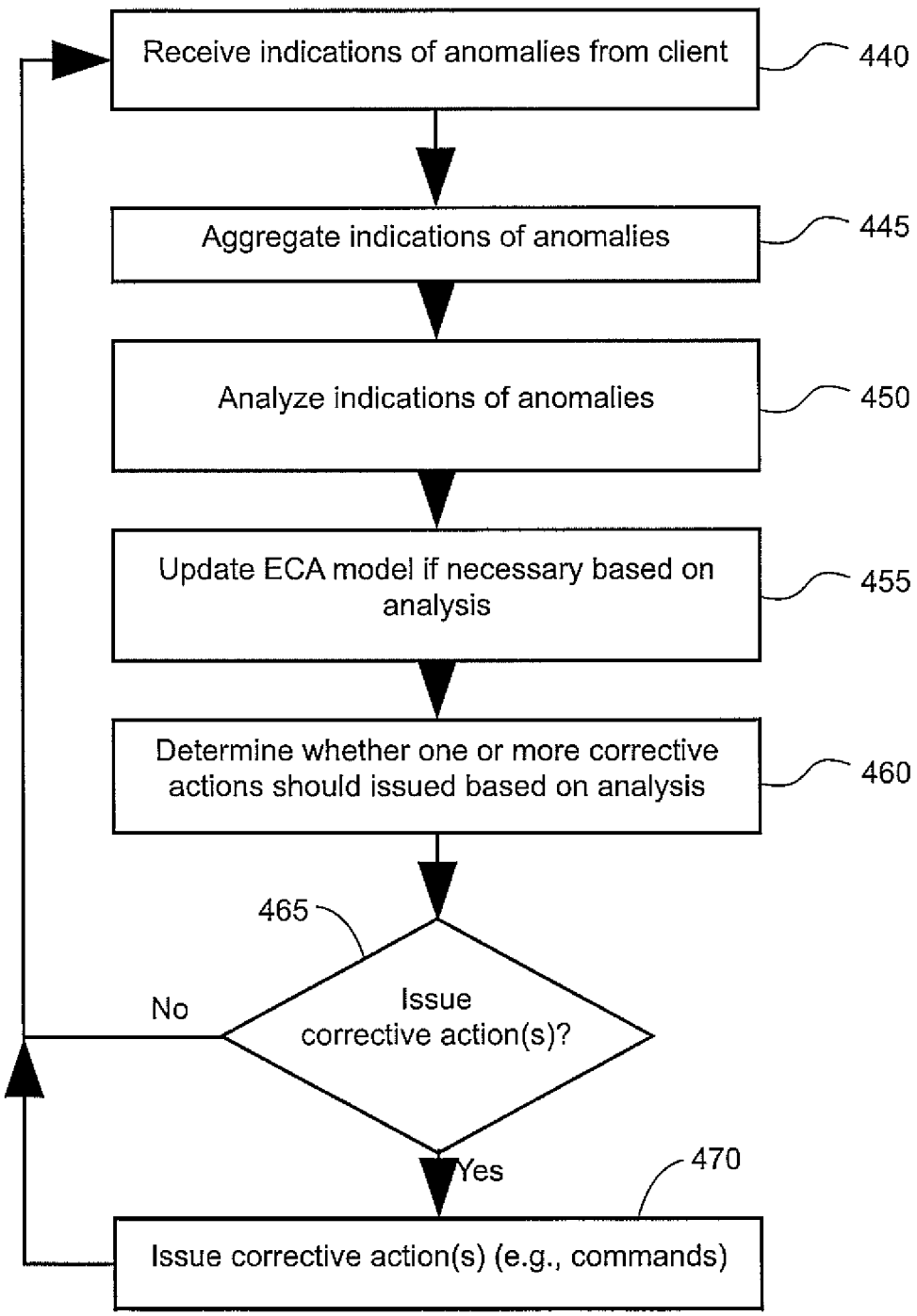
FIG. 5 is logic flow diagram performed by a server for anomaly processing that illustrates the operation of an exemplary method, a result of execution of computer program instructions embodied on a computer readable memory, and/or functions performed by logic implemented in hardware, in accordance with an exemplary embodiment of this invention.

FIG. 5 is logic flow diagram performed by a server for anomaly processing that illustrates the operation of an exemplary method, a result of execution of computer program instructions embodied on a computer readable memory, and/or functions performed by logic implemented in hardware, in accordance with an exemplary embodiment of this invention. FIG. 5 may be considered to be performed by the ECA manager 180 as part of the anomaly processing module 40. This example applies, in an exemplary embodiment, to the connected mode of the computing device 112.

In block 440, the ECA manager 180 receives indications 60 of anomalies from the client, computing device 112. In block 445, the ECA manager 180 aggregates the indications 60 of the anomalies, e.g., by adding the indications 60 to previously received similar or the same anomalies. In block 450, the ECA manager 180 analyzes the indications 60 of anomalies 250. In block 455, the ECA manager 180 updates the ECA model 185, if necessary, based on the analysis performed in block 450. In block 460, the ECA manager 180 determines whether one or more corrective actions 55 should issued based on analysis. In this example, the corrective actions may be commands 56 or may include other actions. As stated above, in the ECA model 185, the event is the detection of an anomaly 250, the condition evaluates the event to see what actions (if any) apply, and exemplary corrective actions 55 are stated already above. If corrective action(s) are not to be issued (block 465=No), the flow continues to block 440. If corrective action(s) 55 are to be issued (block 465=Yes), in block 470, the corrective actions 55 (such as commands 56) are issued and the flow continues to block 440. The issuing may include transmitting the corrective actions(s) 55 over a network toward one or more computing devices 112.

Another option is provide a permanent ECA manager 180 on the computer system 12, and the ECA manager 190 is not provided. In this option, in FIG. 4A, block 330 is not performed and block 340 is performed periodically. FIG. 4B is therefore not performed, and instead ECA manager 180 performs FIG. 5 in response to receiving indications 60 of anomalies 250.

Thus, in an example, for application-level anomaly detection (AD), the AD may only affect enterprise applications, the anomalies may be detected on-line, there may be immediate corrective actions, and the anomalies may be eventually transmitted for further analysis. Furthermore, embodiments may implement existing AD techniques (e.g., via the anomaly-detection engine 230), may learn regular behavior online/offline, may deploy a model (e.g., ECA model 185, which is created using the policy configuration file 42) with an application 160, may enable local corrective actions, and may forward anomalies to the backend (e.g., server 12). The model may contain domain-specific knowledge, models from other devices, and/or indications of false positives.

Figure 6:
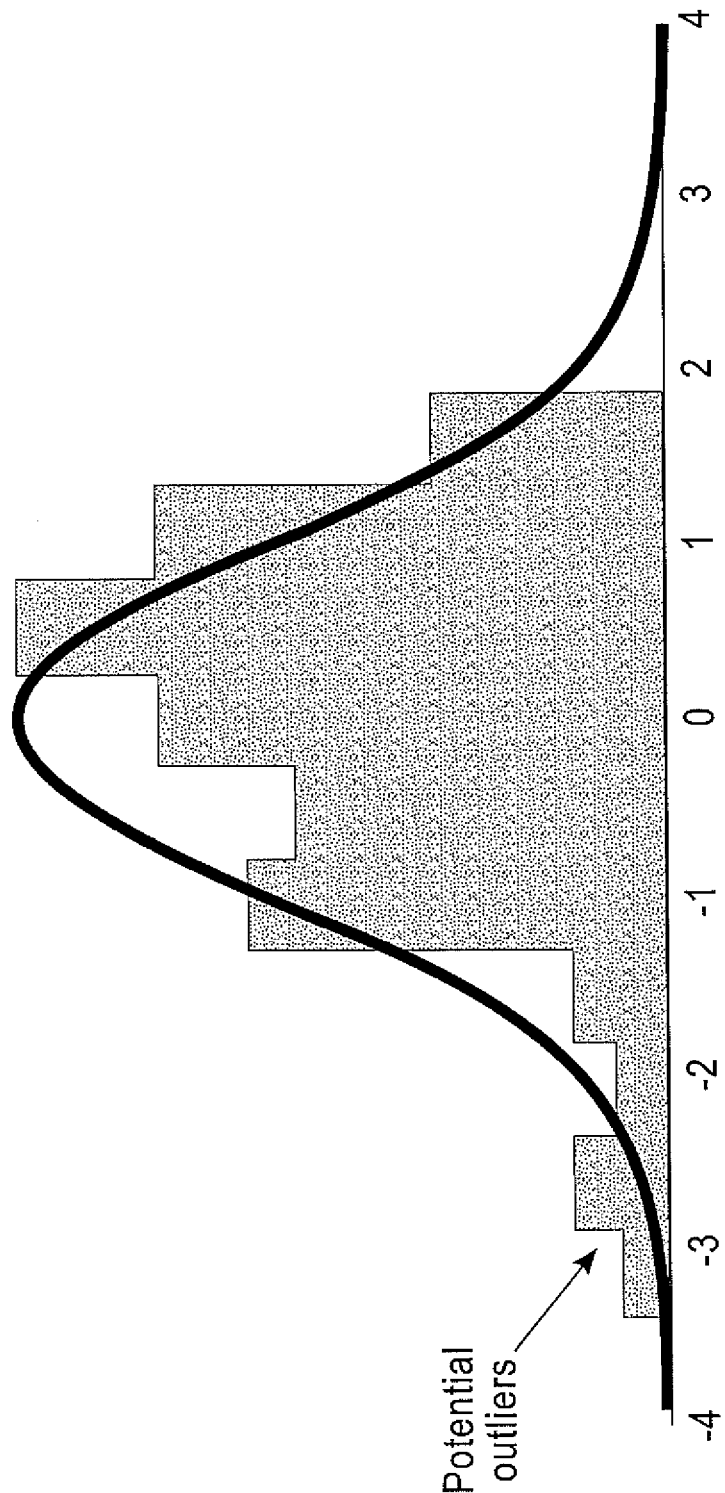
FIG. 6 is an example of a statistical outlier detection graph.

Additional examples are now presented. With regard to possible AD methods 275, many examples are possible. One possible AD method 275 is statistical outlier detection (e.g., Grubbs' test). An example of this is illustrated by FIG. 6. This technique may use a small model with mean and standard deviation, but also uses a strong assumption of normality. On the left-hand side, potential outliers are shown on this normal distribution. Other possible AD methods 275 include machine learning techniques includes general but heavyweight (i.e., processing-intensive) techniques such as 1-class classification or density-based approaches.

Additional AD method 275 examples include finite state models, which are suitable to model interaction (e.g., GUI, API). It is possible to synthesize FSM abstracting from traces. Existing tools for these AD methods may be ported to the particular platform being used.

Figure 7:
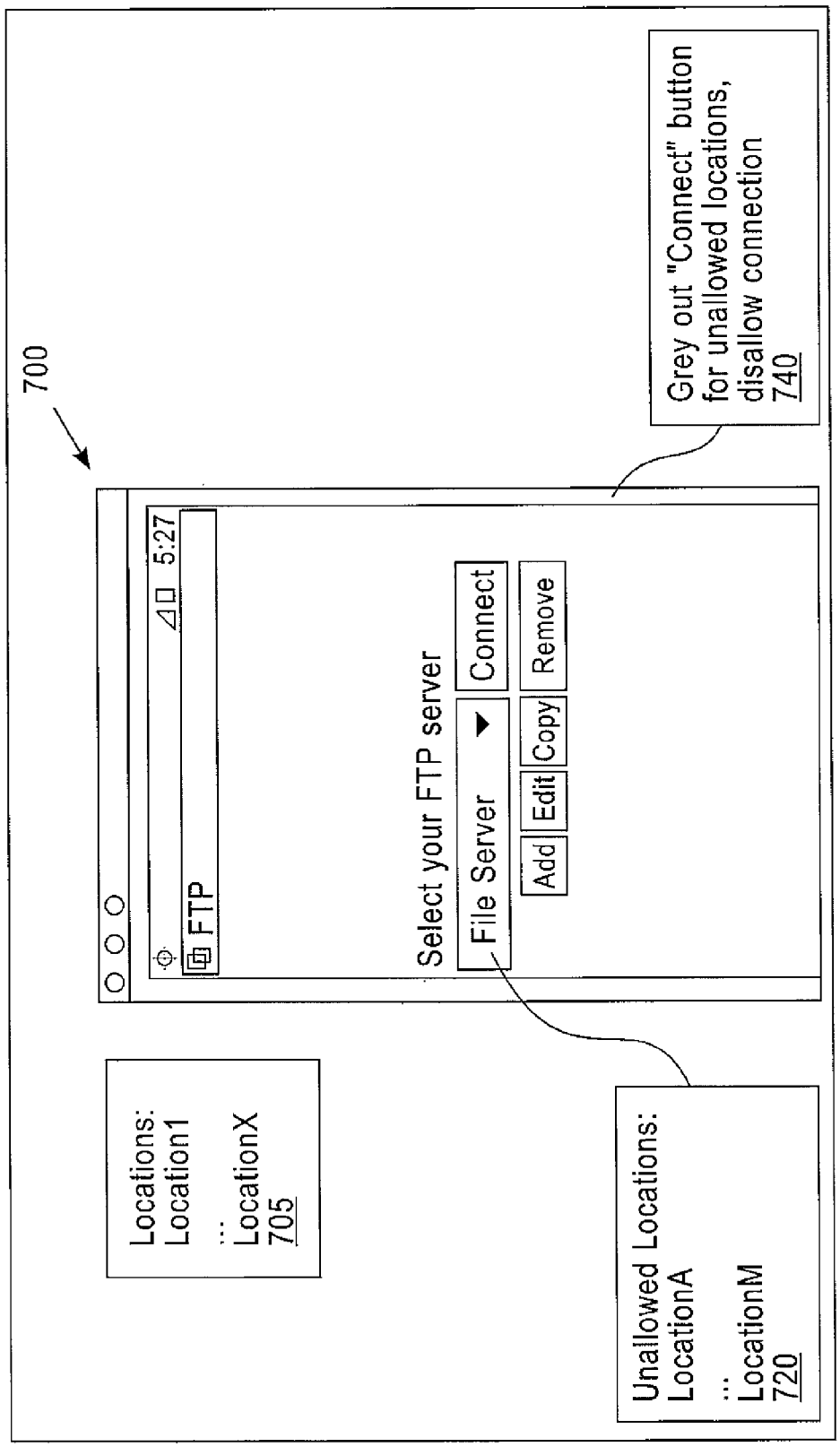
FIG. 7 is an example showing a portion of an FTP interface implemented on a UI of a mobile computing system.

A case study was performed using a binary FTP application from an app market. In this case study, connection was disabled from suspicious locations. The disabling was performed using a location analysis that was application-independent. The anomaly detection module 140 logs position data responsive to a change in view and the ECA manager 190 triggered application specific corrective actions 55 via commands 56. Referring to FIG. 7, this figure is an example showing a portion of an FTP interface 700 implemented on a UI 125 of a mobile computing system 112. The FTP interface 700 is created by an FTP program that can manage several FTP servers and provides a device browser (an interface for which is shown in FIG. 7) and an FTP browser (the interface for which is not shown). The FTP program provides a large amount of functionality (such as renaming files, deleting files, and the like) and supports multiple FTP protocols.

In this example, the anomaly detection engine 230 builds a list 705 of locations (in this example, X locations) and anomalies based on an AD method as implemented in the anomaly detection engine 230. An ECA manager 180/190 builds a list 720 of unallowed locations (e.g., locations A through M) based on indications 60 of anomalies. Based on input from the ECA manager 180/190 (via commands 56), the "Connect" button will be grayed out (block 740) for unallowed locations and connections to FTP servers are disallowed in these locations. In an exemplary embodiment, the mechanism to grey out the box is contained in the instrumentation layer 220. However, the decision logic that determines the box should be grayed out is in the AD layer (e.g., anomaly detection module 140).

This example concerns a model (e.g., ECA model 185) created through observation. That is, locations where FTP is used are observed, and the ECA model 185 is created based on the observations. In terms of an AD method and a policy configuration file 42, these are linked in the policy configuration file 42 by the ECA model 185. For example, consider these series of operations in the FTP location anomaly example being described:

1. The client device 112 moves to new, unauthorized location;
2. The anomaly detection engine 230 creates an anomaly event and forwards an indication 60 of the event to the ECA manager 190/180 (on client or on server, respectively);
3. The ECA manager 180/190 evaluates the corresponding anomaly event as follows:
   a) Check type of anomaly (result: location);
   b) Check specific conditions for event type (result: client reports GPS coordinates that are not within known areas);
   c) Trigger corresponding action based on matching condition (or conditions) (result: command 56 is sent to application to disable upload button).

FIG. 8 is an example of policy configuration file 800, which is an example of policy configuration file 42, used for the example of FIG. 7. The policy configuration file 800 defines three ECA rules called "default, cambridge, and yorktown" for event type "locationAnomalyType". Note that the rules get triggered because the user has never been to those locations before so this is not in their user model. The default policy disables the upload button for all anomalies. Specifically, the default rule will disable the upload button for any anomaly event of locationAnomalyType. The Cambridge policy ignores all events except those that occur within Cambridge, where the policy just sets a warning message. That is, the Cambridge rule will set a label (as a message to the user) if the locationAnomalyType event has coordinates in Cambridge, Mass. Similarly, the Yorktown policy fires a setLabel action if the anomaly occurs within Yorktown. Specifically, the Yorktown rule will set a welcome label if the locationAnomalyType reports coordinates in Yorktown Heights, N.Y.

Another exemplary use for the instant invention is in the area of field testing of applications 160. An exemplary motivation for this use is that applications 160 such as mobile "apps" are hard to lab-test due to, e.g., context and sensors. Furthermore, large scale capture-replay is infeasible. The idea was to detect untested behaviors as anomalies, and to augment lab-tests with field-tests.

A case study was made with a tipping program (a program that calculates tips based on amounts of bills). The application was not modified and was a mobile "app". Random testing was performed to generate event traces. Behavior analysis was performed using a Finite Automaton built from lab-testing. The algorithm "kBehavior" was used to detect untested event sequences.

Figure 9:
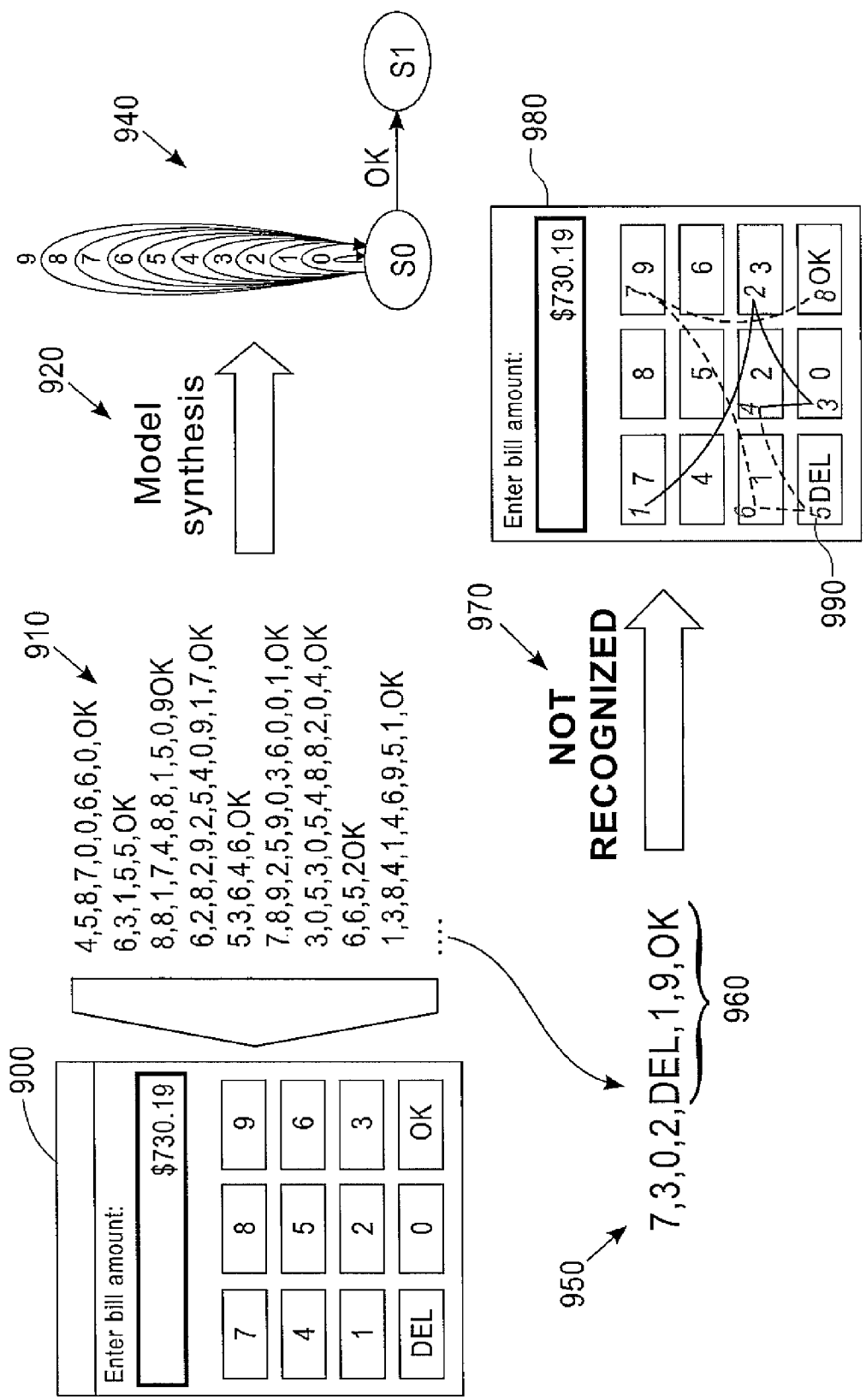
FIG. 9 is an example of anomaly detection and processing for a tipping application.

FIG. 9 is an example of anomaly detection and processing for the tipping application 160. The window 900 is displayed by the application 160 on the UI 125 of the mobile computing device 112. Reference 910 indicates key sequences that were used to determine the Finite Automaton 940 determined via a model synthesis 920. The Finite Automaton 940 then is the AD method 275 used by the anomaly detection engine 230. The anomaly detection module 140 then determines that the new key sequence 950, which should result in a value of $730.19 (as shown in window 980). However, this key sequence 950, which is input by a user via path 990, is not recognized (970) and therefore is an anomaly. In this instance, the indication of the anomaly could be the key sequence 950, and a corrective action 55 could be a patch to/reinstallation of the application.

Figure 10:
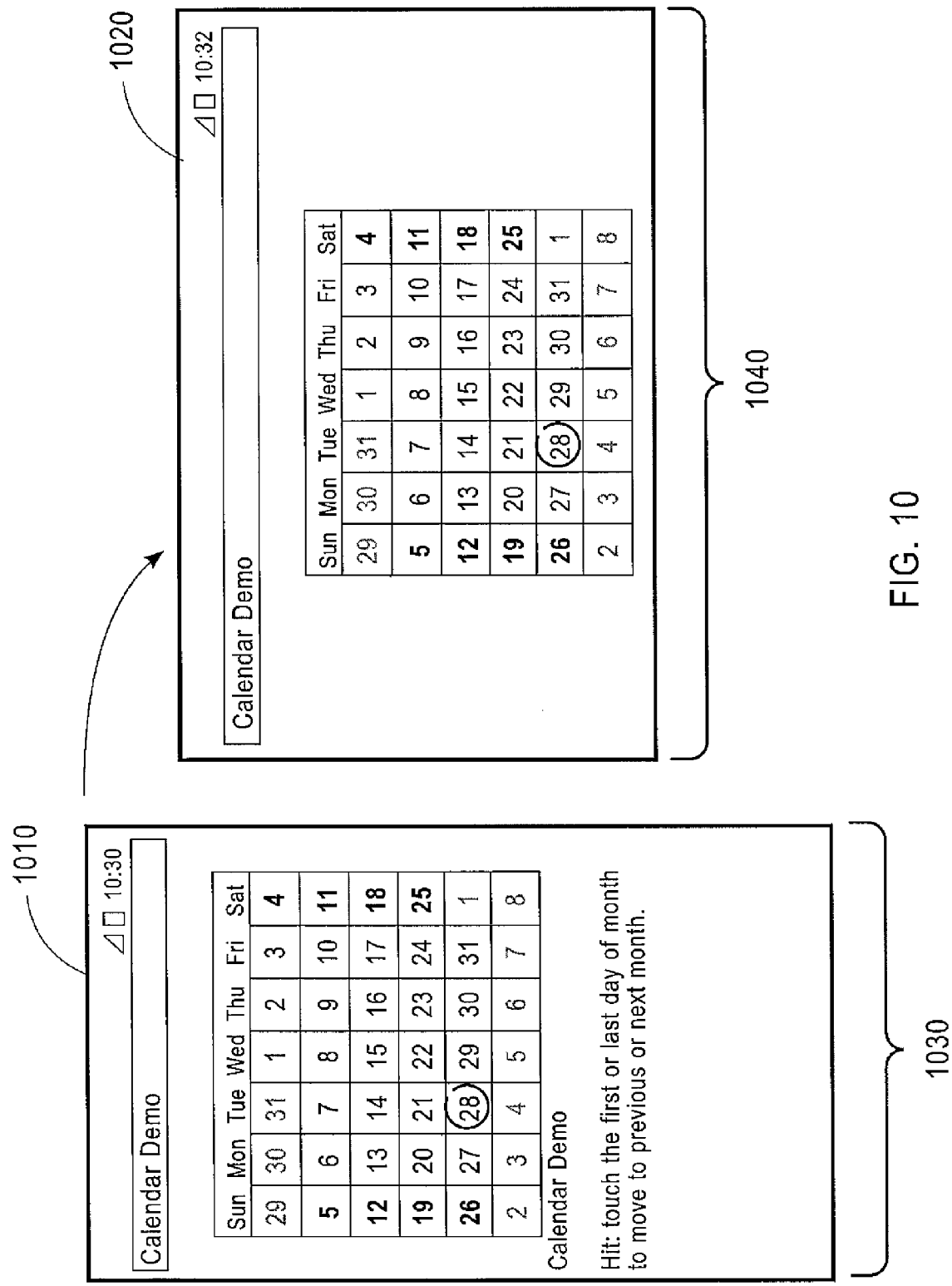
FIG. 10 is an example of a mobile computing device and an anomaly where a calendar view does not auto-fit to the screen size based on screen orientation.

Another example case study relates to failure detection. In this case, layout failures from public issue trackers, where the layout failures are hard to reproduce especially in an emulator. The layout analysis for a anomaly detection module 140 includes logging (according to a policy configuration file 42) position/dimensions of GUI elements, and the AD method 275 used is a Grubbs' test against previous data. The anomaly detection module 140 can therefore highlight mis-positioned views via indications 60 of the same. FIG. 10 is an example of a mobile computing device where a calendar view does not auto-fit to the screen size based on screen orientation. That is, in the orientation 1010, the calendar correctly fits the screen size (at least as per width 1030 of the screen), but in the orientation 1020, the calendar does not correctly fit the screen size as per width 1040 of the screen. Using an appropriate policy configuration file 42 (e.g., and AD method 275), the anomaly detection module 140 can detect this mis-positioned view and send an indication 60 of the same to a server 12.

Referring to FIG. 11, this figure is an example of a music application that has an anomaly of a vertical layout issue. Using an appropriate policy configuration file 42 (e.g., and AD method 275), the anomaly detection module 140 can detect this vertical layout issue and send an indication 60 of the same to a server 12. In this example, the UI window 1110 is presented to a user on the UI 125 of a display 124 of a mobile computing device 112. The entire portion 1140 of the UI window 1110 should be shown on the UI 125. However, only the portion 1120 is shown on the UI 125. The other portion 1130 is off the screen and not shown on the UI 125. The indication 60 may be the indication 1150 "Window outside of screen range". This indication 1150 may also include data about the UI window 1110 (or other data about the application 160), such as "Screen resolution=A×B" 1160 and/or "Data on screen=Bruce Springsteen, We Shall Overcome: The Seeger Sessions, Jacob's Ladder" 1170.

One cause of this issue may be due to low resolution of the display of the platform (e.g., mobile device). Another cause of this issue may be if album title is two lines long (as shown in FIG. 11). The volume control is pushed off screen (via vertical layout of the UI window 1110 by the application 160) and the volume control cannot be manipulated. Using an appropriate policy configuration file 42 (e.g., and AD method 275), the anomaly detection module 140 can detect this vertical layout anomaly and send an indication 60 of the same to a server 12. The indication 60 in this example could additionally have other information, such as screen resolution or display information (e.g., what is being displayed for the album title and song).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Acronyms that appear in the text or drawings are defined as follows.
AD Anomaly Detection
API Application Programming Interface
ECA Event-Condition-Action
FSM Finite State Machine
FTP File Transfer Protocol
GPS Global Positioning System
GUI Graphical User Interface
IT Information Technology
JSON JavaScript Object Notation
OS Operating System
PC Personal Computer
UI User Interface
WiFi Wireless Fidelity
XML eXtensible Markup Language

What is claimed is:

1. A method, comprising:
    intercepting one or more activities performed by an application on a computing device, the intercepting using an instrumentation layer separating the application from an operating system on the computing device;
    comparing the one or more activities performed by the application with one or more anomaly detection policies in a policy configuration file to detect or not detect presence of one or more anomalies in the application, wherein comparing further comprises using an anomaly detection method to determine whether information produced by the anomaly detection method meets criteria in the policy configuration file, wherein a comparison detects presence of the one or more anomalies in response to the information meeting the criteria; and
    in response to the comparison detecting presence of one or more anomalies, storing one or more indications comprising the presence and characteristics of the one or more anomalies.

2. The method of claim 1, wherein the policy configuration file is separate from a process that performs the comparing and storing.

3. The method of claim 2, further comprising receiving the policy configuration file or an update to the policy configuration file using a network.

4. The method of claim 2, wherein the policy configuration file is one of a text file, a JavaScript object notation input file, or an extensible markup file.

5. The method of claim 1, wherein intercepting further comprises intercepting all activities performed by the application by using the instrumentation layer.

6. The method of claim 1, further comprising in response to being in a first mode, sending the stored one or more indications of the anomalies over a network toward a server.

7. The method of claim 6, further comprising in response to being in a second mode, performing the following:
    analyzing the one or more indications of the one or more anomalies to determine whether one or more corrective actions should be implemented; and
    responsive to a determination one or more corrective actions should be implemented based on the analyzing, implementing the one or more corrective actions.

8. The method of claim 7, further comprising updating a model used to determine whether the one or more anomalies occurs based on the policy configuration file.

9. The method of claim 8, wherein the model comprises an event-condition-action model, wherein events, conditions, and actions are described by the policy configuration file.

10. The method of claim 7, wherein the first mode is a connected mode and the second mode is a disconnected mode.

11. The method of claim 10, wherein the connected mode is entered in response to the computing device being able to connect to the server and wherein the disconnected mode is entered in response to the computing device not being able to connect to the server.

12. The method of claim 1, wherein the one or more anomalies comprise one or more of a privileged control access on the operating system, a difference in a wireless service provider as compared to one or more allowed wireless service providers, a difference in WiFi network as compared to one or more allowed WiFi networks, an unallowed location as compared to one or more allowed locations, an attempt to reach a forbidden domain, an attempt to use an unauthorized data storage repository, an inconsistent time of use of the computing device as compared to previous uses of the computing device, unauthorized or inconsistent usage of the application, and problems in the application.

13. The method of claim 1, wherein the one or more anomalies comprise a problem in the application.

14. The method of claim 13, wherein the one or more indications comprise data about a sequence of inputs created by a user using the application and one or more indications of a problem caused by the sequence of inputs.

15. The method of claim 13, wherein the one or more indications comprise data about a window created by the application and presented on a display of the computing device and data about the window.

16. The method of claim 1, wherein the computing device is a mobile computing device.

17. A method, comprising:

receiving one or more indications of presence and characteristics of one or more anomalies experienced by an application on one or more computing devices, wherein the one or more indications of one or more activities are determined by the one or more computing devices intercepting the one or more activities using an instrumentation layer separating the application from an operating system on the one or more computing devices, and wherein a presence of the one or more anomalies comprise being detected in response to the information produced by an anomaly detection method meets criteria in a policy configuration file;

analyzing the one or more indications of the one or more anomalies in the application to determine whether one or more corrective actions concerning the application should be issued; and responsive to a determination one or more corrective actions should be issued based on the analyzing, issuing the one or more corrective actions to the one or more computing devices.

18. The method of claim 17, wherein at least the analyzing is performed using a policy configuration file that is a same policy configuration file as on the one or more computing devices.

19. The method of claim 17, wherein the one or more anomalies comprise one or more of a privileged control access on the operating system, a difference in a wireless service provider as compared to one or more allowed wireless service providers, a difference in WiFi network as compared to one or more allowed WiFi networks, an unallowed location as compared to one or more allowed locations, an attempt to reach a forbidden domain, an attempt to use an unauthorized data storage repository, an inconsistent time of use of the computing device as compared to previous uses of the computing device, unauthorized or inconsistent usage of the application, and problems in the application.

* * * * *